United States Patent [19]

Barger

[11] Patent Number: 4,895,760

[45] Date of Patent: Jan. 23, 1990

[54] FILM COATING FOR RIGID, SMOOTH SURFACES

[75] Inventor: Dennis D. Barger, Midlothian, Va.

[73] Assignee: Tredegar Industries, Inc., Richmond, Va.

[21] Appl. No.: 107,132

[22] Filed: Oct. 9, 1987

[51] Int. Cl.$^4$ .................. B32B 27/36; B32B 27/08
[52] U.S. Cl. .................. 428/332; 428/412; 428/516; 428/514; 428/520; 428/475.5; 428/480; 428/430; 428/435; 428/458; 428/463; 428/522; 156/242; 156/306.3
[58] Field of Search .................. 428/412, 337

[56] References Cited

U.S. PATENT DOCUMENTS

| | | | |
|---|---|---|---|
| 3,503,843 | 3/1970 | Williams, Jr. et al. | 526/351 |
| 3,746,566 | 7/1973 | Hiratsuka et al. | 428/412 X |
| 4,394,416 | 7/1983 | Shimizu et al. | 428/412 X |

FOREIGN PATENT DOCUMENTS 1116541  6/1986  Japan .................. 428/412

*Primary Examiner*—P. C. Ives
*Attorney, Agent, or Firm*—Emch, Schaffer, Schaub & Porcello Co.

[57] ABSTRACT

Covering a rigid but pliable, smooth surface with a one-sided matte embossed polyethylene film, where the non-embossed smooth side of the film is in direct contact with the smooth surface being covered. Adhesion of the smooth side of the film to the smooth surface to which it is applied is effected much like a vacuum adhesion as seen when a drop of water is placed between two sheets of glass. The embossed side of the film forms microscopic air pockets when rolled upon itself which prevents blocking. This feature allows the non-embossed side to be made as smooth as possible without the need for an anti-blocking agent.

10 Claims, No Drawings

4,895,760

FILM COATING FOR RIGID, SMOOTH SURFACES

TECHNICAL FIELD

This invention relates to the masking of rigid but pliable, smooth surfaces and more particularly to masking with polyethylene film.

BACKGROUND

The function of a masking film is to form a protective cover or coating to prevent scratching, scuffing, and/or distortions of the smooth surface to which it is applied. This protective cover or coating is necessary for shipment and/or during use of the product having the smooth surface.

Heretofore, conventional corona treated film and or adhesive coated masking paper have been used for masking applications upon rigid or hard, but still pliable, smooth surfaces of plastics especially polycarbonates. Polycarbonate sheet being rigid and over 10 mils thick is usually masked with adhesive backed paper. By contrast, polycarbonate film being flexible and less than or equal to 10 mils thick is usually masked with polyethylene film.

In masking polycarbonate film, two different types of polyethylene film are used to protect the sides of the polycarbonate film. One side may be covered with a one mil, corona treated, non-embossed, low slip, low density polyethylene film. The other side may be covered with a 3 mil, low density polyethylene film which has been coated with a heat activated adhesive. Frequently, polycarbonate film is sold by the manufacturer to intermediate operations which print upon the polycarbonate film prior to shipment to an end user. The polyethylene film is used as a protective layer both before and after the polycarbonate sheet is printed. The 1 mil layer is normally removed immediately before printing where the adhesive coated, 3 mil, low density layer remains on the polycarbonate throughout the printing process and is only removed by the end user. Normally in the manufacturing process, both polyethylene film layers are applied to the polycarbonate film simultaneously shortly after it is extruded. The polyethylene is applied with a nip roll when the polycarbonate sheet is between 100° and 200° F. The temperature varies with the thickness of the sheet.

By contrast, polycarbonate sheeting normally utilizes a paper based masking for protection on both sides of the sheet.

The paper uses a heat activated acrylic adhesive to effect its adhesion to the polycarbonate. Frequently, humidity from the air permeates the paper and causes delamination between the paper and the adhesive. This allows the adhesive to remain on the polycarbonate after the paper mask is removed. The adhesive must be removed from the polycarbonate with a solvent.

Existing problems with polyethylene films currently used to mask polycarbonate films or sheets include:

(a) A different polyethylene film is used for each surface or side of the polycarbonate film causing increases in film inventory and complication of logistics and production methods. These increases and complications are a result of handling two types of film rather than one.

(b) Currently used one mil, low slip, low density polyethylene film has been known to completely laminate to the polycarbonate film to which it is applied.

(c) Polyethylene film is received from the manufacturer and applied to the polycarbonate film from a roll. Polyethylene film blocks on the roll and develops hard wrinkles. These hard wrinkles are a problem in that they do not come out of the polyethylene film prior to application on the polycarbonate film. The wrinkle will permanently distort the pliable surface of the polycarbonate film and render it useless for its desired end uses.

(d) The adhesive coated, 3 mil, low density polyethylene film adheres to the polycarbonate film through the use of a heat activated adhesive. This adhesive can leave a residue on the polycarbonate film which is also undesirable.

(e) Problems exist with the paper film mask used to protect the polycarbonate sheeting from scratches and dents during shipping and handling. The paper with adhesive is applied to the polycarbonate sheet at temperatures ranging from 100°-320° F. Frequently humidity from the air permeates the paper and causes delamination. Similar problems exist for acrylic, glass, polished or painted metals and other items which have a rigid, smooth surfaces.

These currently used films of the related art will now be explained in more detail.

The one mil, low slip, low density polyethylene film is a corona treated type of masking film. Corona treatment is the utilization of an electrostatic discharge to increase the film's adhesion level. The electrostatic discharge causes surface oxidation of the film whereby the non-polar saturated hydrocarbon surface becomes more chemically reactive to polar surfaces which, in effect, increases the adhesion level of the non-polar surface. Currently used masking film is non-embossed and relies on a very narrow window of corona treatment to facilitate the films adhesion to a smooth surface. The problem with the corona treatment process is that it cannot be controlled precisely enough to insure production is maintained within the desired window. When there is too little corona treatment, the masking film will not adhere to a smooth surface. When there is too much corona treatment, the masking film will either stick to itself and block within the roll, or the film will laminate to the smooth surface to which it is applied and become unremovable.

Corona treated masking films have a relatively high surface coefficient of friction (greater than 0.5). These films are extremely difficult to wind without inducing hard wrinkles which will distort a pliable, smooth surface upon application. Corona treated masking films normally have large and numerous gels and carbon specks which tend to dimple or distort the smooth surface of the substrate being protected. Gels are defined as unmelted polyethylene particles which range from a barely visible size up to larger than a pencil point.

Consequently, these masking films rely on chemical differential slip where the chemical additive blooms or migrates to the outside surface of the masking film. While this prevents blocking or sticking of the masking film as it is unwound from the roll, the slip normally impairs the film's adhesion to a smooth surface rendering it less desirable as a masking film.

The aforedescribed adhesive coated, 3 mil, low density, polyethylene film is an example of an adhesive masking film. These films are non-embossed and affect their adhesion from a surface applied adhesive. The disadvantages of this type of film is that the adhesive residue is frequently left on the smooth surface following removal of the mask. Solvents must be used to remove this residue. At times the adhesive is too aggressive (adheres with great strength) which virtually makes the masking film unremovable. Similar to corona treated maskings, the adhesive masking films also are subject to hard wrinkles and gels.

While one-sided, matte embossed, polyethylene films used by this invention are in existence, they are used as photopolymer cover sheets. Most photopolymers have the consistency of jelly. The photopolymers are coated upon a base of polyester film which acts as a protective carrier sheet. The one-sided, matte embossed, polyethylene film is then applied with the smooth, non-embossed side coming in contact with the exposed photopolymer surface and acting as a cover sheet. The net result is a three layered sandwich consisting of polyester film/pohotopolymer/matte polyethylene which is then wound up in rolls of varying widths of up to 60 inches and diameters of 10-12 inches.

Currently, photopolymers are made using two different types of polyethylene cover sheet films. If a photopolymer coating is to be thin, a one-sided matte polyethylene film is used with the smooth side applied to the photopolymers. If the photopolymer layer is to be thicker, a two-sided matte polyethylene film would be used. The difference between one-sided and two-sided matte embossed being only that in one-sided matte embossed, one side is smooth and the opposite side is matte embossed while in two-sided matte embossed, both sides of the film are matte embossed. A two-sided embossment is made by a matte engraved roll that compression embosses the molten polyethylene between the embossing roll and a rubber covered well. A one-sided matte is produced by compression of molten polyethylene between a polished chrome roll and a rubber roll.

Photopolymers are used to make circuit boards. Prior to applying photopolymer to a dielectric board, the matte embossed polyethylene is removed from the three layer sandwich previously described. The exposed surface of the photopolymer is then laid upon the dielectric board. The other side of the photopolymer retains the polyester film carrier sheet. A photo tool is then placed on top of the polyester film and the entire multilayer substrate is then exposed to a light source.

The areas of the photopolymer which were exposed to light, harden and form a protective covering in the dielectric board. The dielectric board, with the exposed photopolymer, is then subjected to numerous chemical baths and rinses with the end result producing a printed circuit board.

SUMMARY OF THE INVENTION

This invention concerns the application of a nonembossed side of a one-sided, matte embossed film to a smooth surface without the use of a corona treatment or an adhesive. Current problems in the prior art will be solved by achieving a constant, controlled adhesion level without the masking film becoming unremovable or the deposition of an adhesive residue. Other problems which will be overcome include the prevention of film blocking on the roll and wrinkle-free winding. This problem is overcome by the film being embossed on one side and trapping a quantity of air as it is being wound onto the roll. This air entrapment facilitates the wrinkle-free unwinding of the film from the roll.

The one-sided, matte embossed film incorporates mechanical differential slip as opposed to chemical induced differential slip. Microscopically, the film has a random matte rather than a pattern matte. This means the matte embossed surface has high points or peaks with an irregular pattern which prevent the film from blocking on the roll because there is less intimate contact between the film layers.

Accordingly, this invention concerns application of a mask made of a one-sided, matte embossed masking film to rigid or hard, but still pliable, smooth surfaces such as the surfaces of plastic film and sheets, including surfaces such as a rigid polycarbonate film like Lexan ® film or acrylics such as Plexiglass ® acrylic sheet. In addition, a one-sided, matte embossed film may also be applied to other plastics, glass, glazed stoneware and polished or painted metals or any other smooth surface.

These and other embodiments of this invention will become apparent from the ensuing description and appended claims.

DESCRIPTION OF PREFERRED EMBODIMENTS

Preferably, the mask or coating of a one-sided, matte embossed masking film is applied to a substrate having a rigid but pliable, hard, smooth surface where the surface smoothness is in the range of 0 to 150 Ra. In this connection, Ra is defined as the arithmetic average height of the micro peaks to the center line of a particular finished surface as measured by a profilometer. This measurement is usually expressed in $10^{-6}$ micro inches. Preferred substrates include polycarbonate substrates, especially polycarbonate sheet having a thickness above 10 microns and polycarbonate film having a thickness of 10 microns or less.

An embossed film is used because it forms an air space between successive layers of film as it is turned into a cylindrical roll. These air spaces prevent the layers from adhering to one another and forming a solid unusable piece. Films with random matte embossing are particularly desirable for use in this invention. While the preferred embodiment uses films of polyethylene (both homopolymers and copolymers), films made of polypropylene, polyvinyl chloride, nylon or polyester may also be used.

The film used pursuant to this invention is matte embossed on one side and smooth on the second side. This allows for the film to be both easily unrolled then applied to the surface. The smooth side of the film is applied to the surface being masked because it forms a vacuum adhesion. Thus the film tightly adheres to the substrate but can be removed therefrom when desired.

For best results, the smooth side of the film used as the masking film should have a smoothness in the range of from about 0.25 to about 10 Ra. In addition, the film preferably has less than 10 gels per 25 square feet.

A film made of a low density polyethylene homopolymer is desirable because a film with a low modulus conforms better to the surface to which is applied. A preferred density is less than or equal to 0.925 (e.g., 0.910 to 0.925) and a preferred modulus (a measure of flexial stiffness) is less than 100,000 psi. This density ratio is in accord with the National Flexible Packaging Association Specification B-11, test method D1505. The modulus is in accord with the same Association's test method D882.

If polyethylene film comprises a low density copolymer of ethylene and vinyl acetate, the film becomes softer and sealing temperatures are lowered as the content of vinyl acetate is increased. The film wets out better on a smooth surface because it is softer. Additionally, by minimizing the number of gels and/or carbon specks present upon the film surface, damage due to denting and/or dimpling will be minimized when the film is applied to pliable surfaces. Accordingly, use of such copolymers is also preferred.

The one-sided, matte embossed film such as polyethylene film and the like can be manufactured via well-known cast or blown film processes. The invention is also applicable to films devloped from the compression rolling of films such as by the procedure described in U.S. Pat. Nos. 3,194,863, 3,503,843 and 3,504,075, the disclosure of which is incorporated herein by reference. In general, this process involves passing the film into the nip of a pair of compression rolls. These rolls apply sufficient pressure to the incoming film to reduce its thickness. The rolls, which may be heated to a suitable temperature, are rotated at a speed translating to a linear speed in the nip greater than the incoming film. Thus the rolls slide over the film. To accomplish this, a hydrodynamic wedge is employed in the nip—water or other suitable liquid is applied to the film as it passes into the nip whereby a thin layer of the liquid exists at the interface between the roll and the adjacent film surface. Thus the film is simultaneously compressed and stretched in the machine direction.

Any of a variety of conventional methods can be utilized for applying the film to the substrate and for pressing the applied film against the smooth surface of the substrate. Generally speaking, the film will be taken off from a roll and will be directly applied to the substrate by means of a nip roll or similar system through which the film and the substrate are passed. In this way, the smooth side of the film is applied to and pressed against the smooth side of the substrate all in one operation. If desired the resulting article may be passed through additional compression rolls or the like. Other suitable techniques for forming the articles of this invention will now be readily apparent to those skilled in the art.

It can thus be seen that this invention enables the application of a masking film to a substrate having a smooth surface without relying on an adhesive or Corona discharge or other surface treatment for achieving the requisite adhesion. In short, the adhesion depends solely upon the intimate contact between the smooth side of the film and the smooth surface of the substrate and in accomplishing this objective, the masking film used in this operation can be taken directly from a roll of the film. In this unwinding operation, the matte embossed finish on the one side of the masking film prevents the film from blocking and thus it is removed free of such problems as tearing, distortion or wrinkling. Thus anti-blocking additives are unnecessary in the masking films—indeed their presence in amounts more than 400 parts per million would be detrimental as they would tend to prevent the desired adhesion between the masking film and the substrate. In this connection, if small amounts (up to about 400 parts per million) of anti-blocking agents are used, it is desirable to use an diatomaceous earth anti-blocking additive such as $SiO_2$.

Many other variations, modifications, and alternate embodiments may be made in the article and techniques hereinbefore described, by those having experience in this technology, without departing from the concept of the present invention. Accordingly, it should be clearly understood that article and methods referred to in the foregoing description illustrative only and are not intended as limitations on the scope of this invention, as defined in the following claims.

What is claimed is:

1. An article comprised of a substrate having a rigid or hard, smooth surface and having affixed thereto a thermoplastic film having on one side thereof an embossed matte finish and on the other side thereof a smooth surface ranging in smoothness from about 0.25 to about 10 Ra, the smooth surface of the film being affixed to the smooth surface of the substrate whereby said film adheres tightly to said surface due solely to the intimate contact between said smooth surface of said substrate and said smooth surface of said film.

2. An article of claim 1 wherein said substrate is composed of polycarbonate.

3. An article of claim 1 wherein said substrate is composed of a polycarbonate sheet having a thickness above 10 microns and having a surface smoothness in the range of from zero to 150 Ra.

4. An article of claim 1 wherein said substrate is composed of a polycarbonate film having a thickness of 10 microns or less and having a surface smoothness in the range of from zero to 150 Ra.

5. An article of claim 1 wherein said film is a polyethylene film.

6. An article of claim 1 wherein said film is a low density polyethylene copolymer film.

7. An article of claim 1 wherein said substrate is composed of a polycarbonate sheet having a thickness above 10 microns and having a surface smoothness in the range of from zero to 150 Ra; and wherein said film affixed thereto is a polyethylene film.

8. An article of claim 1 wherein said substrate is composed of a polycarbonate film having a thickness of 10 microns or less and having a surface smoothness in the range of from zero to 150 Ra; and wherein said film affixed thereto is a polyethylene film.

9. An article of claim 1 wherein said substrate is composed of a polycarbonate sheet having a thickness above 10 microns and having a surface smoothness in the range of from zero to 150 Ra; and wherein said film affixed thereto is a low density polyethylene copolymer film.

10. An article of claim 1 wherein said substrate is composed of a polycarbonate film having a thickness of 10 microns or less and having a surface smoothness inthe range of from zero to 150 Ra; and wherein said film affixed thereto is a low density polyethylene copolymer film.

* * * * *

UNITED STATES PATENT AND TRADEMARK OFFICE
CERTIFICATE OF CORRECTION

PATENT NO. : 4,895,760
DATED : January 23, 1990
INVENTOR(S) : Barger, Dennis D.

It is certified that error appears in the above-identified patent and that said Letters Patent is hereby corrected as shown below:

Column 4, line 31:  Delete "micro" and
                    insert --(micro)--.

Signed and Sealed this

Fifth Day of December, 2000

Attest:

Q. TODD DICKINSON

Attesting Officer

Director of Patents and Trademarks